March 23, 1926. 1,577,812
M. A. ROBINSON ET AL
FISHING REEL
Filed July 27, 1925 2 Sheets-Sheet 2
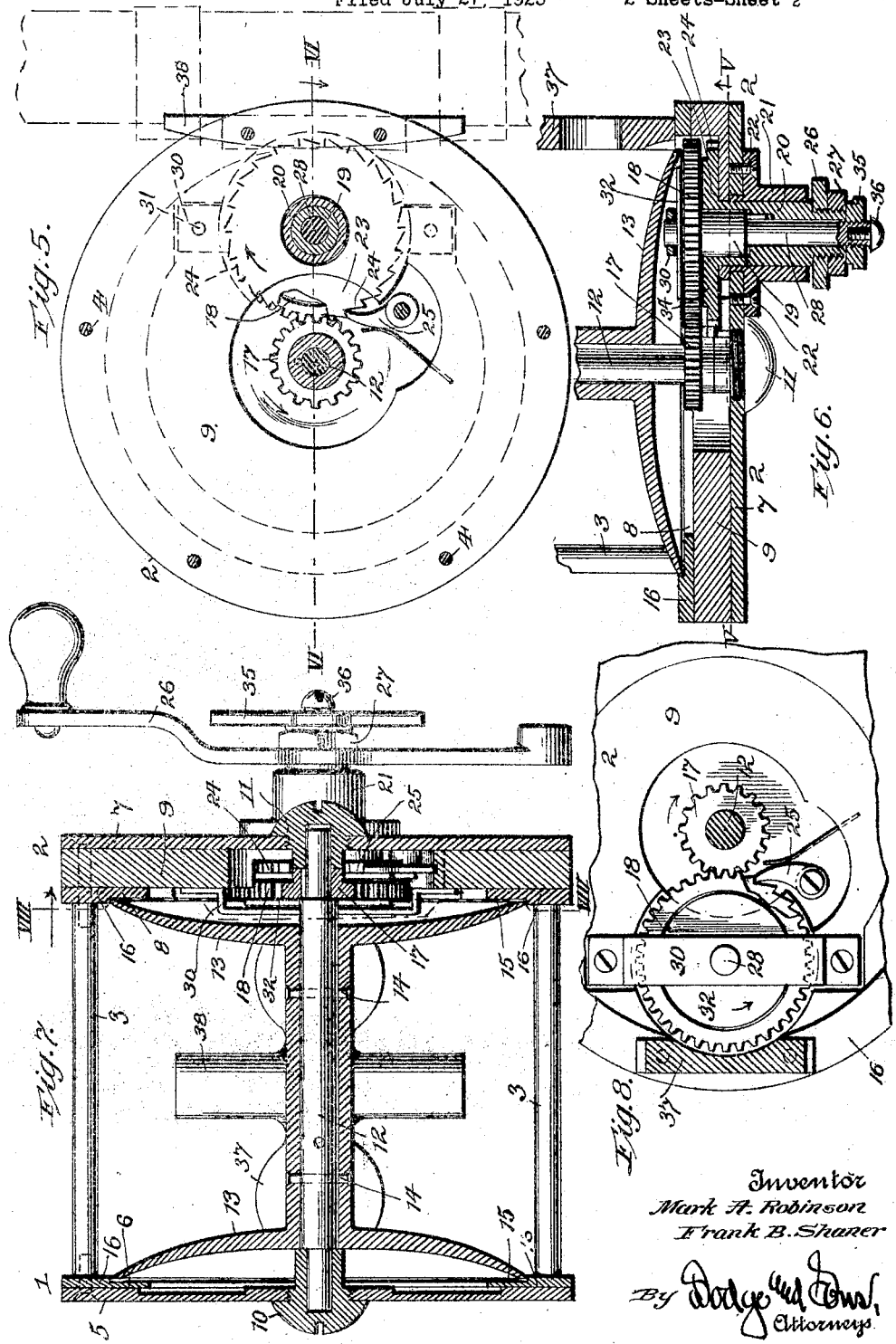

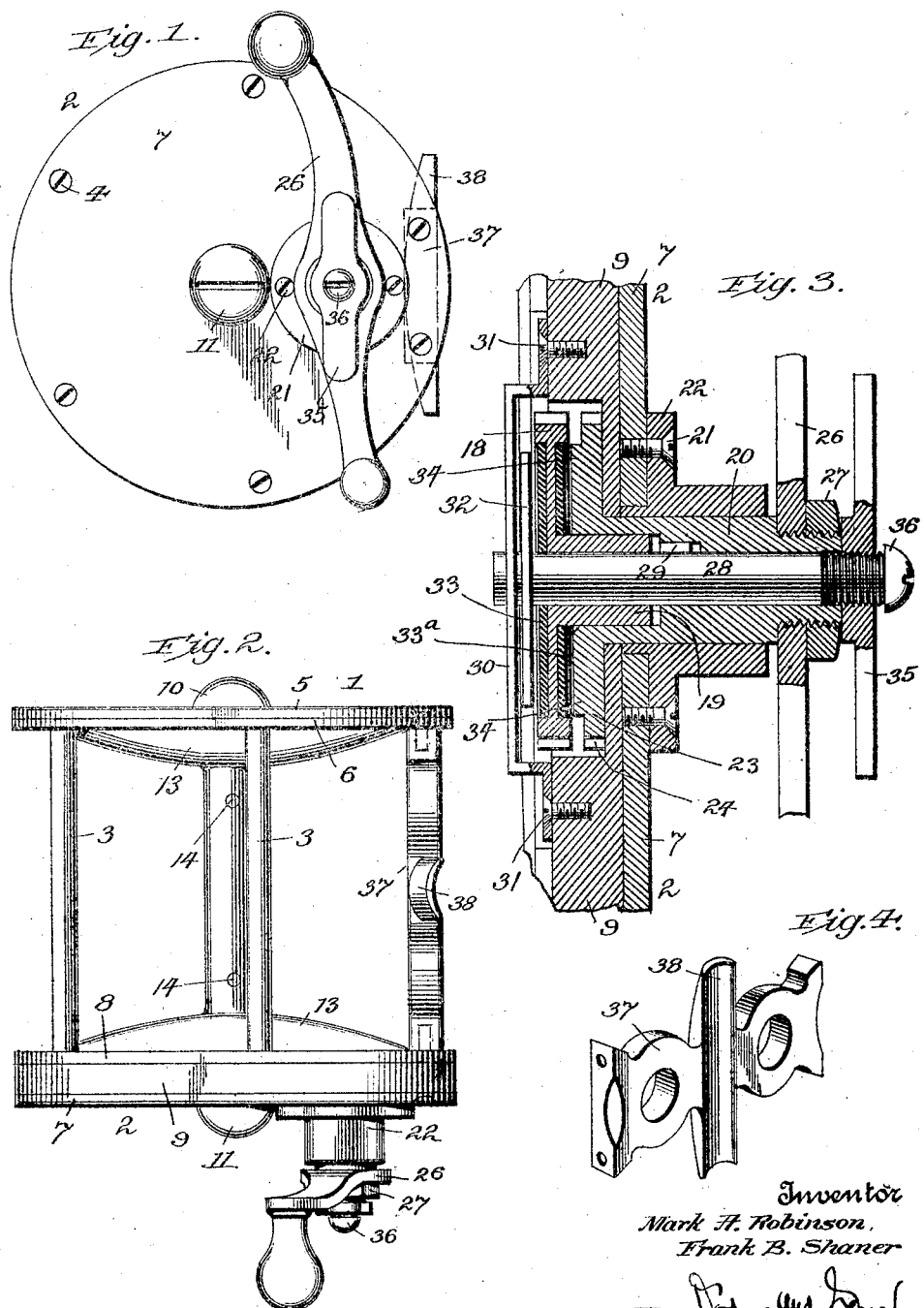

Patented Mar. 23, 1926.

1,577,812

UNITED STATES PATENT OFFICE.

MARK ALEXANDER ROBINSON AND FRANK BARNARD SHANER, OF HONOLULU, TERRITORY OF HAWAII.

FISHING REEL.

Application filed July 27, 1925. Serial No. 46,456.

*To all whom it may concern:*

Be it known that we, MARK A. ROBINSON and FRANK B. SHANER, both citizens of the United States, residing at Honolulu, in the county of Honolulu, Territory of Hawaii, have invented certain new and useful Improvements in Fishing Reels, of which the following is a specification.

This invention relates to improvements in fishing reels of the friction-brake type, adapted to be mounted on rods and employed in casting and in playing a hooked fish. It has for its object the provision of a device of simplified construction, efficient in its operation and capable of withstanding hard usage. More particularly, the invention has for its object the provision of a friction transmission between the crankshaft and the spool that will permit a fine adjustment between the driving and driven parts so that the movement of the line can be controlled with a considerable degree of assurance; and further, the provision of a control means for the friction transmission that is positioned outside of the reel-operating crank so that rotation of the latter will not interfere with the manipulation of the control means.

In carrying out the foregoing objects, the invention consists in the novel construction, combination and arrangement of parts hereinafter specifically described, pointed out in the appended claims and illustrated by the accompanying drawings.

In the drawings, in which similar reference characters designate corresponding parts,—

Fig. 1 is an end elevation of a reel embodying the invention;

Fig. 2 is a plan view;

Fig. 3 is an enlarged detail view showing a section of the friction clamp for connecting the driving and driven parts;

Fig. 4 is a detail perspective view of the bracket for mounting the reel on a rod;

Fig. 5 is a section on line V—V of Fig. 6;

Fig. 6 is a section on line VI—VI of Fig. 5;

Fig. 7 is a diametrical section of the cage and spool; and

Fig. 8 is a section on line VIII—VIII of Fig. 7.

Referring to the drawings, the cage or casing of the reel comprises the cheeks 1 and 2 held apart in parallel relation by the interposed rods 3 secured in place by screws 4 passing through the cheeks into the ends of the rods, the heads of the screws being flush with the outer surfaces of the cheeks. The cheek 1 consists of an outer plate 5 and an inner annular plate 6, the two being held together by the screws 4 passing through the same into the adjacent ends of the rods 3.

The cheek 2 consists of an outer plate 7, an inner annular plate 8 and an intermediate plate 9 of fibre, leather or other analogous material suitable for the purpose; the three plates being clamped together by screws 4 extending through the same into adjacent ends of the rods 3. These three plate members form the housing for the spool-actuating mechanism. To provide the necessary space the intermediate plate 9 is comparatively thick and by making it of fibre instead of metal, a structure light in weight is obtained, which is desirable in such devices, and to this end the metal parts are also made as light as possible, to an extent consistent with the required strength.

In the outer plates of the two cheeks 1 and 2 are turned headed screws 10 and 11, respectively, having bearings in their inner ends coincident with the axis of the cylindrical cage. In these bearings are journaled the ends of the shaft 12 carrying the cast bronze spool 13, fastened thereon by pins 14 passing through the barrel of the spool and the shaft as shown in Fig. 7. The outer faces of the spool heads are concave to lessen the weight and to provide clearance for several entering parts. The inner faces of the spool heads are convex and merge smoothly into the barrel to provide an easy winding surface for the line. The inner faces of the inner plates 6 and 8 of the respective cheeks are countersunk, as at 15, into which countersunk portions the marginal portions of the spool plates extend. The slight overlap, as at 16, at the edges of the spool heads, prevents jamming of the line beneath the edges during the operation of the reel.

On one end of the shaft 12 is keyed the pinion 17 within the housing formed by the cheek 2 and with this pinion meshes the gear 18 having an extended hub 19, as best shown in Fig. 6. The diameter of the gear is considerably greater than that of the pinion to multiply the rotations of the latter when driven by the former. The hub 19 fits into the enlarged bore in the inner end of the tubular crank-shaft 20 journaled in the bearing formed by the flanged thimble 21 axially positioned in the cheek 2 and secured thereto by screws 22 passing through its flange into the outer plate of the cheek. The length of the enlarged bore of the crank-shaft is such as to permit therein inward movement of the extended hub or sleeve 19. On the inner end of the crank-shaft and integral therewith is a circular head 23 within the cheek-housing. This head is of the same diameter as the gear 18 and is in close parallel relation thereto. On the periphery of the disk are ratchet teeth 24 to be engaged by a spring-pressed pawl 25 (Fig. 5) pivoted within the cheek-housing to the inner side of the plate 7. The ratchet teeth and pawl coact to prevent rotation of the disk 23 in one direction, but permit turning in the opposite direction.

On the outer end of the crank-shaft 20 is secured the handle 26 for rotating the same, the handle being threaded on the reduced end of the shaft and made fast thereon by the lock-nut 27. Passing through the coincident bores of the crank-shaft and the gear-hub 19 is the rod 28 axially slidable therein and keyed, as at 29, in the crank-shaft to prevent turning of the rod therein. The inner end of the rod registers with a bearing in the bracket 30 (Figs. 3, 7 and 8) to be guided thereby in its axial movement and also in its rotation with the crank-shaft; this bracket is made fast by screws 31 passing through its ends into the fibre plate 9. On the inner portion of the rod is a disk 32 fast thereto and positioned between the bracket and the gear 18. Gear 18, as will best be seen upon reference to Fig. 3, has its opposite faces provided with counter sunk portions or recesses in which are placed washers 33 and 33ª of leather or other analogous material. The disk 32 is of a diameter slightly less than that of the inner washer 33 and on the outer face of the head 23 is a circular abutment 34 to register with the outer washer. The outer end of rod 28 is threaded to receive the winged tension nut 35, outward movement of the latter on the rod being limited by the head of the screw 36 threaded into the outer extremity of the rod. When the tension nut is turned onto the rod it abuts the end of the crank-shaft and continued turning of the same draws the rod outwardly. This outward movement likewise moves the head 23 against the inner washer 33, and still further movements clamp the drive gear 18 between said head and the disk 32.

On the side of the cage and between the cheeks is secured the bracket 37 (Figs. 2 and 4) having the grooved plates 38 by means of which the reel is attached to the rod in the usual manner.

The clamping or clutch mechanism so described permits the fine adjustment between the driving and driven parts that is so desirable in casting and in playing the hooked fish. It is to be observed that the tension nut whereby the clamping mechanism is manipulated is outside of the crank-shaft handle. So positioned the tension-nut can be readily operated without interference from the crank-shaft handle.

When it is desired to turn the spool to wind in the line, the rod 28 is moved to clamp the gear 18 between the head 23 and the disk 32 by means of the tension nut 35, and thereby the gear is clamped to the crank-shaft. As the pawl 25 is in constant engagement with the ratchet 24 on the head 23 of the crank-shaft, the latter can be rotated in but one direction. When the crank-shaft is rotated the multiplying gear clamped thereto is likewise rotated and as the gear meshes with the pinion 17 on the shaft of the spool, the latter is rotated to wind the line.

When it is desired to pay out the line, by manipulating the tension nut 35 the rod 28 is moved inwardly to separate the clamping members 23 and 32 to release the gear 18. This releases the spool so that it can turn freely to unwind the line. To prevent over-spinning of the spool as the line is payed out, the clamping members can be adjusted to effect a slight braking action on the spool. Also, in reeling in a fish, the clamping mechanism can be adjusted to permit slippage so that the line can pay out should the pull of the fish become excessive in its efforts to free itself. Also, in casting a slight drag on the line can be effected by an adjustment of the clamping mechanism to meet the requirement.

What is claimed is:

1. In a fishing reel, the combination with a cage having an axial shaft journaled therein, a spool fixed on said shaft, a tubular crank shaft journaled in a cheek of the cage, a pinion secured upon the reel shaft, a gear meshing with said pinion, said gear being co-axially mounted with reference to the tubular crank-shaft, friction members secured upon opposite faces of said gear, a rod extending through the crank shaft and the hub of the gear, a head secured at the inner end of said rod, and means for moving said rod endwise to bring the head into engagement with the adjacent friction face carried by the gear and to move the latter laterally and to thereby bring the second friction member into contact with the adjacent portion of the crank shaft.

2. In a fishing reel, the combination with a cage having an axial shaft journaled therein, a spool fixed on the shaft, a pinion fast on the shaft, a gear meshing with the pinion, a tubular crank-shaft journaled in a cheek of the cage and having an abutment opposite to the gear, a friction element between the gear and the abutment of the crank-shaft, and clamping means including a rod extending through the tubular crank-shaft and operative through movement of said rod to effect frictional engagement between the crank-shaft abutment and the gear together with the interposed friction element.

3. In a fishing reel, the combination with a cage having an axial shaft journaled therein, a spool fixed on the shaft, a pinion fast on the shaft, a gear meshing with the pinion, a tubular crank-shaft journaled in a cheek of the cage and having an abutment opposite to the gear, a handle secured on the outer end of the crank-shaft for rotating the same, a friction element between the gear and the abutment of the crank-shaft, clamping means including a rod extending through the tubular crank-shaft and operative through movement of said rod to effect frictional engagement between the crank-shaft abutment and the gear together with the interposed friction element, and a manipulative member on the outer end of the rod and outside of the handle on the crank-shaft for moving said rod to operate the clamping means.

4. In a fishing reel, the combination with a cage having an axial shaft journaled therein and a spool fixed on said shaft, of a tubular crank-shaft journaled in a cheek of the cage, a multiplying gear journaled in the crank-shaft and meshing with a pinion fixed on the spool shaft, clutch mechanism on the crank-shaft operative to clamp the multiplying gear to the crank-shaft, a rod extending through the bore of the crank-shaft and connected with the clutch mechanism to operate the latter, and means for adjusting the endwise position of the rod.

5. In a fishing reel, the combination with a cage having an axial shaft journaled therein and a spool fixed on said shaft, of a tubular crank-shaft journaled in a cheek of the cage and having an enlarged bore at its inner end, a multiplying gear meshing with a pinion on the spool shaft and having a hub journaled in the enlarged bore at the inner end of the crank-shaft, clutch mechanism on the crank-shaft operative to clamp the multiplying gear to the crank-shaft, and a rod for actuating the clutch mechanism extending through the crank-shaft and the hub of the multiplying gear, said shaft being keyed to the crank-shaft and axially movable therein to actuate the clutch mechanism.

6. In a fishing reel, the combination with a cage having an axial shaft journaled therein and a spool fixed on said shaft, of a tubular crank-shaft journaled in a cheek of the cage and having a circular head on its inner end, a rod extending through the crank-shaft, a disk fixed on the inner end of the rod, a gear meshing with the pinion on the spool shaft and loose on the rod between the disk and the circular head, and means on the outer end of the rod for moving said rod to move the disk to clamp the gear between the disk and the circular head.

7. In a fishing reel, the combination with a cage having an axial shaft journaled therein and a spool fixed on said shaft, of a tubular crank-shaft journaled in a cheek of the cage and having on its inner end a circular head, pawl-and-ratchet mechanism permitting turning of the crank-shaft in but one direction, a rod extending through the crank-shaft, a disk fixed on the inner end of the rod, a gear meshing with the pinion on the spool shaft and loose on the rod between the disk and the circular head, and means on the outer end of the rod for moving said rod to move the disk to clamp the gear between the disk and the circular head.

8. In a fishing reel, the combination with a cage having an axial shaft journaled therein and a spool fixed on said shaft, of a tubular crank-shaft journaled in a cheek of the cage and having on its inner end a circular head with ratchet teeth on the periphery thereof, a spring-pressed pawl operating to engage the ratchet teeth to prevent turning of the crank-shaft in one direction and to permit turning in the opposite direction, a rod extending through the crank-shaft, a disk fixed on the inner end of the rod, a gear meshing with the pinion on the spool shaft and loose on the rod between the disk and the circular head, and means on the outer end of the rod for moving said rod to move the disk to clamp the gear between the disk and the circular head.

9. In a fishing reel, the combination with a cage having an axial shaft journaled therein and a spool fixed on said shaft, of a tubular crank-shaft journaled in a cheek of the cage and having on its inner end a circular head with ratchet teeth on the periphery thereof, a spring-pressed pawl operating to engage the ratchet teeth to prevent turning of the crank-shaft except in one direction, a rod extending through the crank-shaft, a disk fixed on the inner end of the rod, a gear meshing with a pinion on the spool shaft and having a hub journaled in the inner end of the crank-shaft, said gear being located between the circular head of the crank-shaft and the disk on the rod, and means on the outer end of the rod for moving said rod to move the disk to clamp the gear between the disk and the circular head.

10. In a fishing reel, the combination with a cage having an axial shaft journaled therein, a spool fixed on the shaft, a tubular crank-shaft journaled in a cheek of the cage and having a concentric circular abutment, a handle secured on the outer end of the crank shaft for rotating the same, a gear meshing with a pinion fixed on the spool shaft, said gear being positioned opposite to said circular abutment and having a tubular hub journaled in the tubular crank-shaft, a rod extending through the coincident bores of the crank-shaft and the gear hub, a head fast on the inner end of the rod opposite the inner face of the gear, friction elements interposed between the gear and the circular abutment and the rod head, and a manipulative member threaded on the outer end of the rod and outside of the crank-shaft handle; the turning of said manipulative member operating to move the rod to actuate the rod head to effect frictional engagement between the crank-shaft and the gear.

In testimony whereof we have signed our names to this specification.

MARK ALEXANDER ROBINSON.
FRANK BARNARD SHANER.